(12) United States Patent
Chen et al.

(10) Patent No.: US 6,457,154 B1
(45) Date of Patent: Sep. 24, 2002

(54) DETECTING ADDRESS FAULTS IN AN ECC-PROTECTED MEMORY

(75) Inventors: Chin-Long Chen, Fishkill; Mu-Yue Hsiao, Poughkeepsie; Patrick J. Meaney, Poughkeepsie; William Wu Shen, Poughkeepsie, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/451,261

(22) Filed: Nov. 30, 1999

(51) Int. Cl.[7] .............................................. G11C 29/00
(52) U.S. Cl. ...................................................... 714/768
(58) Field of Search ................................. 714/768, 777, 714/758, 761, 763, 805

(56) References Cited

U.S. PATENT DOCUMENTS

| | | | | |
|---|---|---|---|---|
| 4,241,446 A | * | 12/1980 | Trubisky | 714/777 |
| 4,464,753 A | | 8/1984 | Chen | 371/38 |
| 4,862,463 A | | 8/1989 | Chen | 371/38 |
| 5,099,484 A | * | 3/1992 | Smelser | 714/761 |
| 5,226,043 A | * | 7/1993 | Pughe et al. | 714/768 |
| 5,751,740 A | * | 5/1998 | Helbig, Sr. | 711/203 |
| 5,774,481 A | | 6/1998 | Meaney et al. | 371/40.1 |
| 5,841,795 A | | 11/1998 | Olarig et al. | 370/40.13 |
| 5,978,953 A | * | 11/1999 | Olarig | 714/758 |

OTHER PUBLICATIONS

Chen, C.L., and Hsiao, M.Y., Error–Correcting Codes for Semiconductor Memory Applications: A State–of–the–Art Review, 28 IBM Journal of Research and Development, 124 (Mar., 1984).

* cited by examiner

Primary Examiner—Albert Decady
Assistant Examiner—Cynthia Harris
(74) Attorney, Agent, or Firm—Lawrence D. Cutter, Esq.; Kevin P. Radigan, Esq.; Heslin Rothenberg Farley & Mesiti P.C.

(57) ABSTRACT

Uncorrectable errors are detected during the transmission of a data word according to an error correction code. Then, any address faults are identified from among the detected uncorrectable errors. In addition, address faults as well as uncorrectable memory data failures are detected from among the detected uncorrectable errors. Furthermore, address parity bits are not required to be stored to memory.

40 Claims, 16 Drawing Sheets

DATA IN
10, 12, 14, 16, 18, 20, 22, 24, 36, 38, 40, 42, 44
46, 48, 50, 62, 64, 66, 68, 70, 72, 74, 76, 88, 90
92, 94, 96, 98, 100, 102, 114, 116, 118, 120, 122, 124, 126, 128

$$H = \begin{bmatrix} M_0 M_0 M_0 M_0 M_0 V_0 V_0 \\ M_1 M_5 M_4 M_3 M_2 V_0 V_0 \\ M_2 M_1 M_5 M_4 M_3 V_0 V_1 \\ M_3 M_2 M_1 M_5 M_4 V_0 V_1 \\ M_4 M_3 M_2 M_1 M_5 V_1 V_0 \\ M_5 M_4 M_3 M_2 M_1 V_1 V_0 \end{bmatrix} I_{12}$$

$$M_0 = \begin{bmatrix} 00000000001010101010101010 \\ 00000000000101010101010101 \end{bmatrix}$$

$$M_1 = \begin{bmatrix} 0010111101000010010110100 \\ 0001101011000011100101100 \end{bmatrix}$$

$$M_2 = \begin{bmatrix} 000000011010110000011010111 \\ 0000001101011000011010110 \end{bmatrix}$$

$$M_3 = \begin{bmatrix} 101000101010001110000000010 \\ 010100010101001001000000001 \end{bmatrix}$$

$$M_4 = \begin{bmatrix} 10001000100010001111101010 \\ 01000100010010010010010101 \end{bmatrix}$$

$$M_5 = \begin{bmatrix} 10100100100000000010011111 \\ 01011100010000000001111010 \end{bmatrix}$$

$$V_0 = \begin{bmatrix} 10 \\ 01 \end{bmatrix}$$

$$V_1 = \begin{bmatrix} 01 \\ 11 \end{bmatrix}$$

$$I_{12} = \begin{bmatrix} 100000000000 \\ 010000000000 \\ 001000000000 \\ 000100000000 \\ 000010000000 \\ 000001000000 \\ 000000100000 \\ 000000010000 \\ 000000001000 \\ 000000000100 \\ 000000000010 \\ 000000000001 \end{bmatrix}$$

*fig. 10*

| 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|----|----|----|----|----|----|----|----|----|
| 000 | 000 | 000 | 000 | 000 | 101 | 101 | 101 | 101 | 101 | 101 | 101 | 101 | 000 | 000 | 000 | 000 | 000 | 101 |
| 000 | 000 | 000 | 000 | 000 | 011 | 011 | 011 | 011 | 011 | 011 | 011 | 011 | 000 | 000 | 000 | 000 | 000 | 011 |
| 000 | 101 | 110 | 000 | 011 | 000 | 011 | 011 | 011 | 011 | 011 | 011 | 011 | 101 | 101 | 101 | 000 | 101 | 000 |
| 000 | 011 | 101 | 110 | 000 | 000 | 000 | 110 | 110 | 000 | 110 | 110 | 000 | 011 | 011 | 110 | 000 | 011 | 000 |
| 000 | 000 | 101 | 011 | 000 | 000 | 000 | 000 | 000 | 011 | 011 | 011 | 110 | 011 | 110 | 110 | 101 | 110 | 000 |
| 000 | 000 | 000 | 110 | 011 | 110 | 110 | 110 | 000 | 000 | 000 | 000 | 000 | 000 | 000 | 000 | 000 | 000 | 000 |
| 101 | 000 | 000 | 101 | 011 | 101 | 101 | 000 | 101 | 110 | 101 | 000 | 101 | 101 | 101 | 110 | 110 | 101 | 101 |
| 011 | 000 | 000 | 011 | 011 | 011 | 101 | 011 | 011 | 000 | 000 | 011 | 000 | 000 | 000 | 011 | 011 | 011 | 000 |
| 101 | 101 | 000 | 000 | 101 | 101 | 101 | 101 | 000 | 011 | 011 | 101 | 101 | 101 | 101 | 101 | 101 | 101 | 101 |
| 011 | 000 | 101 | 011 | 011 | 000 | 000 | 101 | 101 | 110 | 101 | 011 | 000 | 000 | 000 | 000 | 000 | 000 | 000 |
| 101 | 000 | 000 | 000 | 000 | 101 | 101 | 110 | 101 | 101 | 101 | 101 | 101 | 101 | 101 | 101 | 101 | 101 | 101 |
| 101 | 000 | 101 | 011 | 000 | 000 | 000 | 000 | 101 | 101 | 011 | 011 | 011 | 000 | 000 | 000 | 000 | 000 | 000 |
| 101 | 011 | 011 | 011 | 000 | 101 | 000 | 000 | 000 | 101 | 011 | 110 | 110 | 011 | 011 | 011 | 000 | 011 | 000 |
| 011 | 110 | 000 | 011 | 000 | 011 | 000 | 000 | 011 | 011 | 110 | 101 | 101 | 000 | 000 | 011 | 011 | 011 | 000 |

*fig. 11A*

| | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|
| | 101 | 101 | 101 | 101 | 101 | 101 | 101 | 000 | 000 | 000 | 000 | 000 | 101 | 101 | 101 | 101 | 101 | 101 | 101 |
| | 011 | 011 | 011 | 011 | 011 | 011 | 011 | 000 | 000 | 000 | 000 | 011 | 011 | 011 | 011 | 011 | 011 | 011 | 011 |
| | 000 | 000 | 101 | 101 | 110 | 110 | 110 | 101 | 000 | 000 | 000 | 000 | 000 | 101 | 000 | 110 | 110 | 101 | 101 |
| | 000 | 000 | 000 | 000 | 101 | 101 | 101 | 011 | 000 | 101 | 101 | 101 | 000 | 000 | 000 | 000 | 101 | 101 | 101 |
| | 000 | 000 | 011 | 011 | 110 | 000 | 000 | 011 | 011 | 011 | 011 | 011 | 000 | 000 | 000 | 000 | 011 | 011 | 011 |
| | 000 | 101 | 000 | 110 | 101 | 101 | 101 | 101 | 110 | 110 | 101 | 101 | 000 | 000 | 000 | 101 | 101 | 110 | 110 |
| | 110 | 011 | 000 | 000 | 011 | 011 | 000 | 011 | 011 | 110 | 110 | 110 | 000 | 101 | 101 | 110 | 110 | 011 | 011 |
| | 101 | 000 | 101 | 101 | 101 | 101 | 101 | 000 | 000 | 110 | 101 | 101 | 101 | 101 | 000 | 000 | 000 | 101 | 101 |
| | 000 | 110 | 000 | 000 | 011 | 011 | 011 | 000 | 000 | 000 | 000 | 011 | 011 | 110 | 101 | 000 | 011 | 011 | 011 |
| | 000 | 101 | 101 | 110 | 000 | 000 | 101 | 101 | 101 | 101 | 101 | 101 | 011 | 101 | 000 | 000 | 000 | 110 | 110 |
| | 101 | 000 | 000 | 101 | 101 | 101 | 101 | 011 | 011 | 000 | 000 | 000 | 101 | 000 | 110 | 101 | 110 | 000 | 000 |
| | 011 | 000 | 011 | 011 | 011 | 011 | 011 | 011 | 011 | 011 | 011 | 011 | 011 | 011 | 011 | 011 | 000 | 000 | 000 |

*fig. 11B*

| 38 | 39 | 40 | 41 | 42 | 43 | 44 | 45 | 46 | 47 | 48 | 49 | 50 | 51 | 52 | 53 | 54 | 55 | 56 |
|---|---|---|---|---|---|---|---|---|---|---|---|---|---|---|---|---|---|---|
| 101 | 000 | 000 | 000 | 000 | 000 | 101 | 101 | 101 | 101 | 101 | 101 | 101 | 101 | 000 | 000 | 000 | 000 | 000 |
| 011 | 000 | 000 | 000 | 000 | 000 | 011 | 011 | 011 | 011 | 011 | 011 | 011 | 011 | 000 | 000 | 000 | 000 | 000 |
| 101 | 101 | 101 | 000 | 101 | 000 | 101 | 000 | 110 | 110 | 000 | 000 | 000 | 101 | 000 | 000 | 000 | 011 | 101 |
| 011 | 011 | 000 | 000 | 011 | 101 | 011 | 000 | 101 | 101 | 000 | 000 | 000 | 011 | 000 | 000 | 000 | 110 | 101 |
| 110 | 101 | 000 | 101 | 000 | 000 | 000 | 101 | 000 | 011 | 110 | 101 | 101 | 101 | 101 | 101 | 000 | 101 | 011 |
| 101 | 011 | 000 | 011 | 000 | 101 | 000 | 011 | 000 | 000 | 101 | 011 | 011 | 011 | 011 | 011 | 000 | 011 | 101 |
| 000 | 011 | 000 | 011 | 000 | 011 | 000 | 000 | 000 | 000 | 011 | 011 | 011 | 011 | 101 | 000 | 101 | 000 | 011 |
| 000 | 101 | 101 | 110 | 000 | 101 | 000 | 000 | 000 | 000 | 000 | 110 | 110 | 110 | 101 | 000 | 011 | 000 | 101 |
| 110 | 000 | 011 | 110 | 110 | 011 | 000 | 000 | 101 | 101 | 101 | 101 | 101 | 101 | 101 | 101 | 011 | 101 | 011 |
| 101 | 000 | 101 | 101 | 101 | 110 | 000 | 000 | 011 | 000 | 000 | 011 | 011 | 000 | 011 | 011 | 110 | 000 | 000 |
| 101 | 000 | 000 | 101 | 101 | 101 | 101 | 110 | 000 | 000 | 000 | 110 | 110 | 000 | 000 | 000 | 110 | 110 | 101 |
| 011 | 000 | 000 | 000 | 011 | 011 | 011 | 101 | 000 | 011 | 011 | 101 | 101 | 101 | 011 | 011 | 101 | 101 | 011 |
| 011 | 000 | 000 | 000 | 110 | 011 | 011 | 101 | 000 | 000 | 110 | 110 | 011 | 011 | 000 | 011 | 101 | 101 | 110 |

*fig. 11C*

| 57 | 58 | 59 | 60 | 61 | 62 | 63 | 64 | 65 | 66 | 67 | 68 | 69 | 70 | 71 | 72 |
|---|---|---|---|---|---|---|---|---|---|---|---|---|---|---|---|
| 101 | 101 | 101 | 101 | 101 | 101 | 101 | 101 | 101 | 101 | 101 | 000 | 000 | 000 | 000 | 000 |
| 011 | 011 | 011 | 011 | 011 | 011 | 011 | 011 | 011 | 011 | 011 | 000 | 000 | 000 | 000 | 000 |
| 101 | 110 | 000 | 000 | 011 | 101 | 101 | 110 | 101 | 101 | 000 | 101 | 000 | 000 | 000 | 000 |
| 011 | 101 | 000 | 000 | 110 | 011 | 011 | 101 | 011 | 011 | 000 | 011 | 000 | 000 | 000 | 000 |
| 101 | 000 | 110 | 101 | 000 | 000 | 000 | 101 | 101 | 110 | 000 | 000 | 101 | 000 | 000 | 000 |
| 011 | 000 | 101 | 011 | 000 | 000 | 000 | 011 | 011 | 110 | 000 | 000 | 011 | 000 | 000 | 000 |
| 000 | 101 | 000 | 110 | 110 | 101 | 101 | 011 | 101 | 011 | 000 | 000 | 000 | 101 | 000 | 000 |
| 000 | 011 | 000 | 101 | 101 | 011 | 011 | 110 | 110 | 110 | 000 | 000 | 000 | 011 | 000 | 000 |
| 000 | 000 | 000 | 000 | 101 | 011 | 011 | 101 | 101 | 101 | 000 | 000 | 000 | 000 | 101 | 000 |
| 000 | 000 | 000 | 000 | 011 | 110 | 110 | 011 | 110 | 011 | 000 | 000 | 000 | 000 | 011 | 000 |
| 000 | 000 | 000 | 011 | 000 | 101 | 101 | 101 | 011 | 000 | 000 | 000 | 000 | 000 | 000 | 101 |
| 000 | 000 | 101 | 110 | 110 | 011 | 011 | 000 | 011 | 101 | 000 | 000 | 000 | 000 | 000 | 101 |
| 000 | 000 | 011 | 000 | 101 | 011 | 011 | 110 | 101 | 101 | 000 | 000 | 000 | 000 | 000 | 011 |

*fig. 11D*

$$H = \begin{bmatrix} M_0V_0 & M_0V_0 & M_0V_0 & M_0V_0 & M_0V_0 \\ M_1V_0 & M_5V_1 & M_4V_1 & M_3V_0 & M_2V_0 \\ M_2V_0 & M_1V_0 & M_5V_1 & M_4V_1 & M_3V_0 \\ M_3V_0 & M_2V_0 & M_1V_0 & M_5V_1 & M_4V_1 \\ M_4V_1 & M_3V_0 & M_2V_0 & M_1V_0 & M_5V_1 \\ M_5V_1 & M_4V_1 & M_3V_0 & M_2V_0 & M_1V_0 \end{bmatrix} I_{12}$$

$$M_0 = \begin{bmatrix} 000000000001010101010101010 \\ 000000000001010101010101010 \end{bmatrix}$$

$$M_1 = \begin{bmatrix} 0010111101000010010011010 0 \\ 0001101011000001110010110 0 \end{bmatrix}$$

$$M_2 = \begin{bmatrix} 00000001101011000001101011 \\ 00000011010110000011010110 \end{bmatrix}$$

$$M_3 = \begin{bmatrix} 1010001010100011100000010 \\ 0101000101010010010000001 \end{bmatrix}$$

$$M_4 = \begin{bmatrix} 100010001000100011111 01010 \\ 010001000100010010100 10101 \end{bmatrix}$$

$$M_5 = \begin{bmatrix} 1010010010000000001001111 1 \\ 0101110001000000000111101 0 \end{bmatrix}$$

$$V_0 = \begin{bmatrix} 10 \\ 01 \end{bmatrix}$$

$$V_1 = \begin{bmatrix} 01 \\ 11 \end{bmatrix}$$

$$I_{12} = \begin{bmatrix} 100000000000 \\ 010000000000 \\ 001000000000 \\ 000100000000 \\ 000010000000 \\ 000001000000 \\ 000000100000 \\ 000000010000 \\ 000000001000 \\ 000000000100 \\ 000000000010 \\ 000000000001 \end{bmatrix}$$

*fig. 12*

$$H = \begin{bmatrix} M_0V_0V_0 & M_0V_0V_0 & M_0V_0V_0 & M_0V_0V_0 & M_0V_0V_0 \\ M_1V_0V_0 & M_5V_1V_2 & M_4V_1V_2 & M_3V_0V_0 & M_2V_0V_1 \\ M_2V_0V_1 & M_1V_0V_0 & M_5V_1V_2 & M_4V_1V_2 & M_3V_0V_0 \\ M_3V_0V_0 & M_2V_0V_1 & M_1V_0V_0 & M_5V_1V_2 & M_4V_1V_2 \\ M_4V_1V_2 & M_3V_0V_0 & M_2V_0V_1 & M_1V_0V_0 & M_5V_1V_2 \\ M_5V_1V_2 & M_4V_1V_2 & M_3V_0V_0 & M_2V_0V_1 & M_1V_0V_0 \end{bmatrix} I_{12}$$

$$M_0 = \begin{bmatrix} 000000000001010101010101010 \\ 000000000000101010101010101 \end{bmatrix}$$

$$M_1 = \begin{bmatrix} 0010111101000010010011 0100 \\ 0001101011000011100101100 \end{bmatrix}$$

$$M_2 = \begin{bmatrix} 00000001101011000001101011 \\ 00000011010110000011010110 \end{bmatrix}$$

$$M_3 = \begin{bmatrix} 10100010101000111000000010 \\ 01010001010100100100000001 \end{bmatrix}$$

$$M_4 = \begin{bmatrix} 1000100010001000 1111101010 \\ 01000100010001001010010101 \end{bmatrix}$$

$$M_5 = \begin{bmatrix} 101001001000000001 0011111 \\ 010111000100000000 1111010 \end{bmatrix}$$

$$V_0 = \begin{bmatrix} 10 \\ 01 \end{bmatrix}$$

$$V_1 = \begin{bmatrix} 01 \\ 11 \end{bmatrix}$$

$$V_2 = \begin{bmatrix} 11 \\ 10 \end{bmatrix}$$

$$I_{12} = \begin{bmatrix} 100000000000 \\ 010000000000 \\ 001000000000 \\ 000100000000 \\ 000010000000 \\ 000001000000 \\ 000000100000 \\ 000000010000 \\ 000000001000 \\ 000000000100 \\ 000000000010 \\ 000000000001 \end{bmatrix}$$

fig. 13

DATA IN
10, 12, 14, 16, 18, 20, 22, 24,
36, 38, 40, 42, 44, 46, 48,
50, 62, 64, 66, 68, 70, 72, 74, 76,
88, 90, 92, 94, 96, 98, 100, 102,
114, 116, 118, 120, 122, 124, 126, XP-128

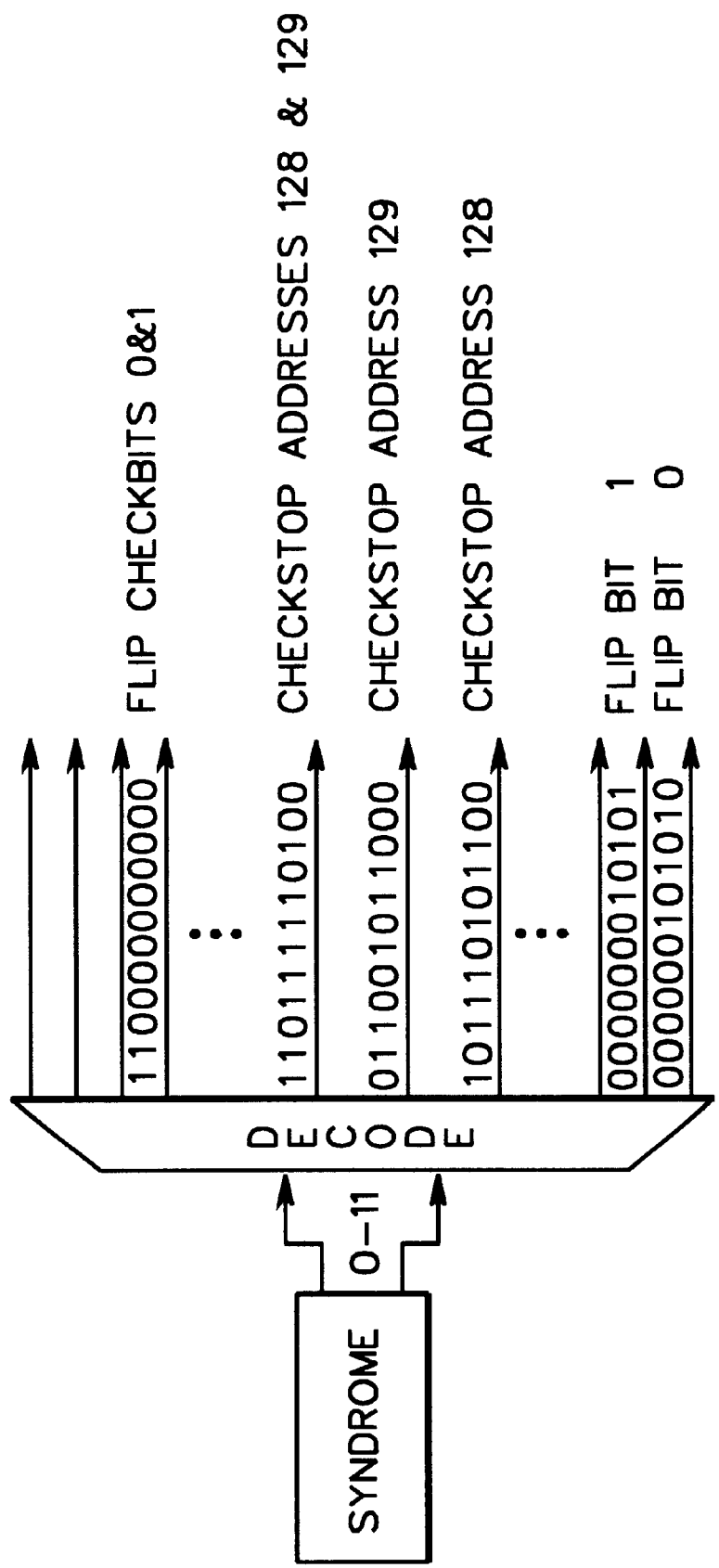

DETECTING ADDRESS FAULTS IN AN ECC-PROTECTED MEMORY

CROSS-REFERENCES TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Single Symbol Correction Double Symbol Detection Code Employing A Modular H-Matrix," Chen et al., Ser. No. 09/451,133;

"Generating Special Uncorrectable Error Codes For Failure Isolation," Chen et al., Ser. No. 09/452,079; and "Method, System And Program Products For Error Correction Code Conversion," Chen et al., Ser. No. 09/450,548.

Technical Field

This invention relates, in general, to computer error correction codes and, in particular, to detecting address faults in an error correction code-protected memory.

BACKGROUND ART

The small size of computer transistors and capacitors, combined with transient electrical and electromagnetic phenomena cause occasional errors in stored information in computer memory systems. Therefore, even well-designed and generally reliable memory systems are susceptible to memory device failures.

In an effort to minimize the effects of these memory device failures, various error checking schemes have been developed to detect, and in some cases correct, errors in messages read from memory. The simplest error detection scheme is the parity bit. A parity bit is an extra bit included with a binary data message or data word to make the total number of 1's in the message either odd or even. For "even parity" systems, the parity bit is set to make the total number of 1's in the message even. For "odd parity" systems, the parity bit is set to make the total number of 1's in the message odd. For example, in a system utilizing odd parity, a message having two 1's would have its parity bit set to 1, thereby making the total number of 1's odd. Then, the message including the parity bit is transmitted and subsequently checked at the receiving end for errors. An error results if the parity of the data bits in the message does not correspond to the parity bit transmitted. As a result, single bit errors can be detected. However, since there is no way to detect which particular bit is in error, correction is not possible. Furthermore, if two or any even number of bits are in error, the parity will be correct and no error will be detected. Parity therefore is capable of detecting only odd numbers of errors and is not capable of correcting any bits determined to be in error.

Error correction codes (ECCs) have thus been developed to not only detect but also correct bits determined to be in error. ECCs utilize multiple parity check bits stored with the data message in memory. Each check bit is a parity bit for a group of bits in the data message. When the message is read from memory, the parity of each group, including the check bit, is evaluated. If the parity is correct for all of the groups, it signifies that no detectable error has occurred. If one or more of the newly generated parity values are incorrect, a unique pattern called a syndrome results which may be used to identify the bit in error. Upon detection of the particular bit in error, the error may be corrected by complementing the erroneous bit.

A widely used type of ECC utilized in error control in digital systems is based on the codes devised by R.W. Hamming, and thus take the name "Hamming codes". One particular subclass of Hamming codes includes the single error correcting and double error detecting (SEC-DED) codes. As their name suggests, these codes may be utilized not only to correct any single bit error but also to detect double bit errors.

Another type of well-known ECC is the single symbol correction and double symbol detection (SSC-DSD) codes which are used to correct single symbol errors and detect double symbol errors. In systems implementing these types of codes, the symbol represents a multiple bit package or chip. Hence, as the name implies, an SSC-DSD code in a system utilizing n bit symbols would be capable of correcting n bits in a single symbol and detecting errors occurring in double symbols.

One limitation of these two well-known ECCs is their inability to identify address failures or address faults. An address failure or fault occurs when data is either stored to or retrieved from an erroneous memory location. For example, an address fault occurs when data intended to be stored at one location is mistakenly stored at another location. Similarly, data intended to be fetched from one location may be mistakenly fetched or retrieved from another location. The above-discussed ECCs protect only against memory data failures and hence neither are capable of detecting or identifying address faults.

One technique used to identify these address faults is to transmit parity along with the address bits. In this manner, address failures may be detected by a discrepancy in the parity. However, this technique suffers from the inability to detect address faults occurring after the parity has been stripped off within the memory chips.

Another technique is to store extra address or parity bits within the memory along with the data. Although, this technique may be used to detect address failures occurring after the parity bits have been stripped off within the memory chips, additional memory circuitry and hardware are required to implement this technique. Furthermore, techniques of this type are incapable of distinguishing between address faults and other types of uncorrectable errors, for instance, multiple symbol memory data failures.

Thus, a need exists for an address fault protection scheme capable of detecting address faults which does not require address parity bits to be stored into memory. In addition, a need also exists for an address fault protection scheme capable of distinguishing between address faults and other types of uncorrectable errors.

SUMMARY OF THE INVENTION

The shortcomings of the prior art are overcome and additional advantages are provided through the provision of an address fault detection capability for detecting address faults in an ECC-protected memory. In one example, a method of identifying address faults includes: detecting an uncorrectable error during transmission of a data word; and determining whether the uncorrectable error is an address fault.

In an enhanced embodiment of the invention, the uncorrectable errors are detected according to an error correction code which is generated according to a H-matrix. In one example, the H-matrix comprises a plurality of subsets arranged in a plurality of rows and columns, wherein each of at least one row of the plurality of rows comprises, in part, multiple iterations of one subset of the plurality of subsets, and a remainder of the plurality of rows comprises, in part, a cyclic permutation of all remaining subsets of the plurality of subsets.

In another enhanced embodiment, the invention includes isolating the address fault to a subgroup of address bits of a group of address bits corresponding to an address to which the data word was intended to be transmitted, wherein the subgroup of address bits contains at least one faulty bit.

In yet another enhanced embodiment, the invention distinguishes between address faults and other types of uncorrectable errors. In particular, these other types of uncorrectable errors may be, for instance, memory data failures.

In another example, a system for identifying address faults includes: means for detecting uncorrectable errors during transmission of a data word; and means for determining whether the uncorrectable error is an address fault.

In yet another example, a system for identifying address faults includes: a controller adapted to detect uncorrectable errors during transmission of a data word; and determine whether said uncorrectable error is an address fault.

In still yet another example, an article of manufacture comprises a computer usable medium having computer readable program code means embodied therein for causing the identifying of address faults. The computer readable program code means includes: computer readable program code means for detecting an uncorrectable error during transmission of a data word; and computer readable program code means for determining whether the uncorrectable error is an address fault.

Thus described herein is a technique for identifying address faults in an error correction code-protected memory. This technique first detects any uncorrectable errors occurring during the transmission of a data word. Then, any address faults are identified from among the detected uncorrectable errors. In this manner, address faults as well as uncorrectable memory data failures are detected. In addition, the present invention identifies address faults without requiring any address parity bits to be stored to memory.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 10 depicts one example of an H-matrix according the present invention;

FIGS. 11A–11D depict one example of a syndrome decoding table generated according to the H-matrix of FIG. 10;

FIG. 12 depicts another example of an H-matrix according the present invention;

FIG. 13 depicts yet another example of an H-matrix according the present invention;

FIG. 19 depicts one example of a block diagram of the logic used to decode the syndrome of FIG. 17 and produce checkstops in accordance with the present invention.

BEST MODE FOR CARRYING OUT THE INVENTION

In accordance with the principles of the present invention, address faults are detected in an error correction code-protected memory. In one example, any uncorrectable errors occurring during the transmission of a data word are detected. Then, address faults are identified from among the detected uncorrectable errors. In this manner, address faults as well as uncorrectable memory data failures are detected. In addition, address parity bits are not required to be stored to memory. One example of a computer system incorporating and utilizing the present invention is described in detail with reference to FIG. 1.

Figure 1:
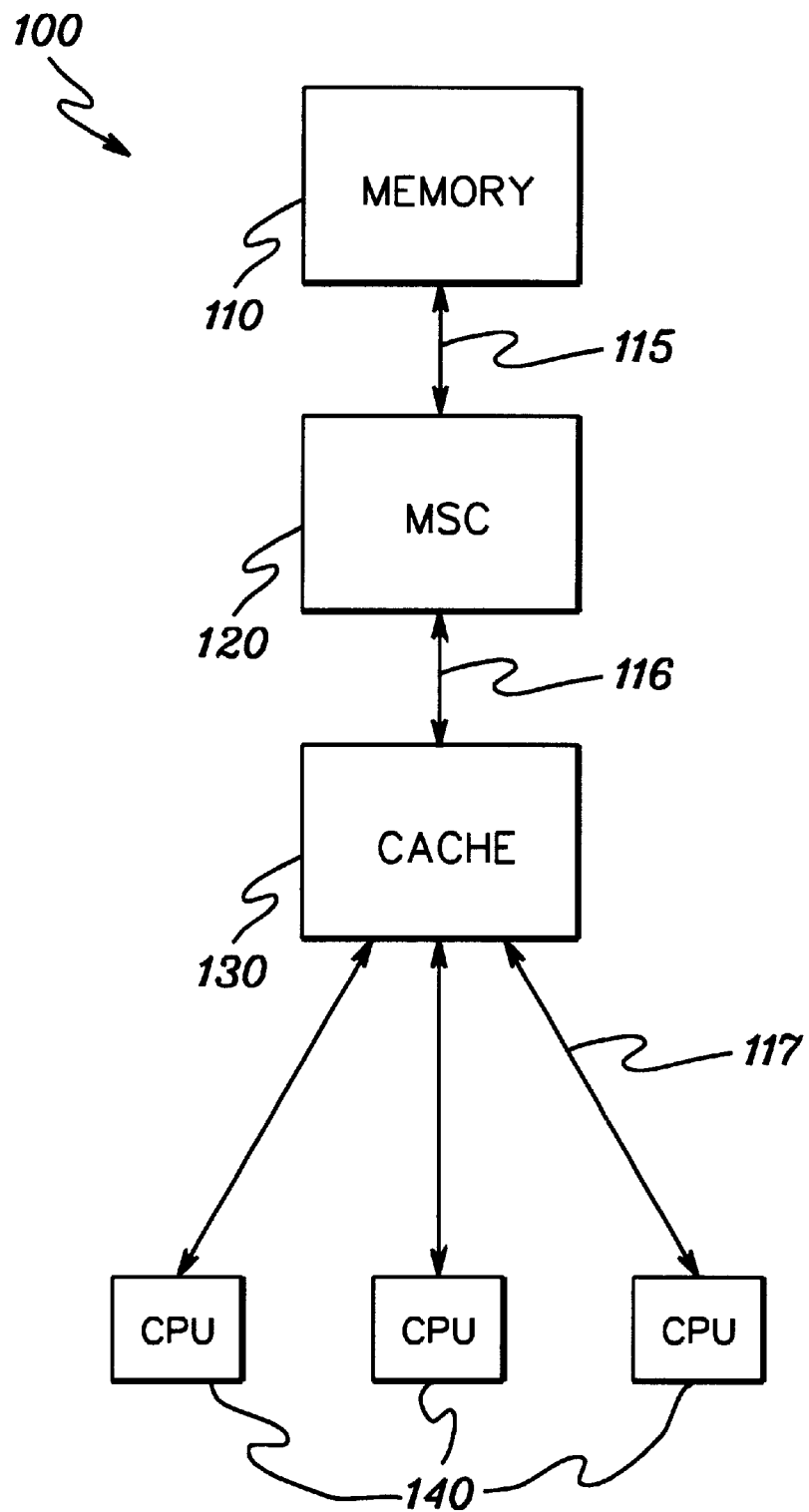
FIG. 1 depicts one example of a computer system in which error correction and/or detection in accordance with the principles of the present invention may be utilized.

FIG. 1 shows a block diagram representation of a computer system 100 utilizing the error correction code of the present invention. In one embodiment, computer system 100 includes a memory 110 connected to a main storage controller (MSC) 120 via a data bus 115, a cache 130 connected to MSC 120 via a data bus 117, and a plurality of central processing units (CPUs) 140 connected to cache 130 via data buses 117. Data buses 117 are used to communicate data between MSC 120 and cache 130 as well as between cache 130 and CPUs 140, respectively, and in this regard may typically be 72 bits wide. Communication of data between memory 110 and MSC 120, on the other hand, occurs via data bus 115. Thus, data bus 115 facilitates the transmission of data read from memory 110 by MSC 120 as well as data written to memory 110 by MSC 120.

Data bus 115, in one embodiment, is 146 bits wide but nevertheless may vary in width according to the requirements of the particular system while still receiving error protection under the ECC of the present invention. In this regard, the ECC of the present invention is specifically designed to meet the data requirements of a wide variety of servers including data buses having widths of, for example, 140, 142, 143, 144, 152, and 162 bits.

The data transmitted in computer system 100 is arranged into a data word having a size dependent on the particular data bus utilized by the system. Furthermore, the data word may be arranged into variably-sized symbols. For instance, in one example, the data word comprises a plurality of two bit symbols. Hence, in this example, a 146 bit data word would include 73 symbols.

Figure 2:
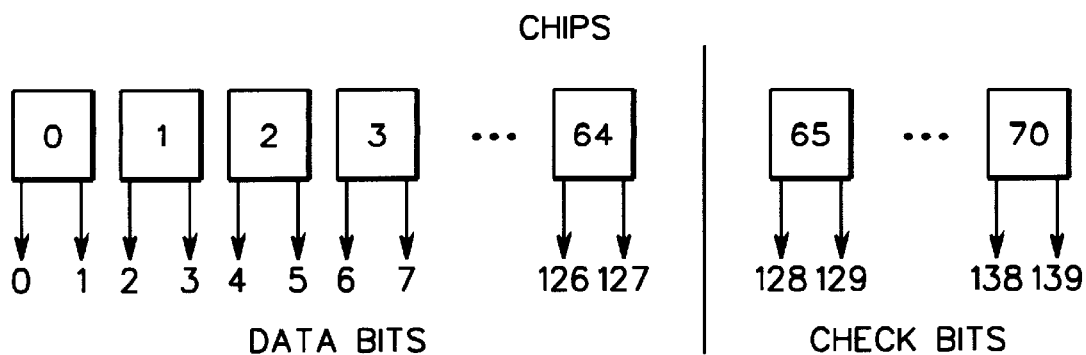
FIG. 2 depicts one example of a memory arrangement in accordance with the present invention.

As shown in FIG. 2, memory 110, for example, comprises a plurality of DRAM devices with each device storing a two-bit package of data on a single chip or symbol. For instance, data bits 0 and 1 are stored on chip 0, and similarly bits 2 and 3 are stored on chip 1. In addition, the embodiment shown in FIG. 2 depicts a 140 bit memory system which is arranged such that the first 128 bits (0–127) are used for data storage and the last 12 bits (128–139) are used to store a plurality of check bits.

In accordance with the principles of the present invention, the check bits are generated as data is transmitted from MSC 120 to memory 110. Upon generation, the check bits are stored, together with the transmitted data, in memory 110. As mentioned above, in the embodiment depicted in FIG. 2, twelve check bits are generated and stored on chips 65–70, with each check bit being associated with a group of data bits stored on chips 0–64. The generation of the check bits is discussed below in detail with reference to FIGS. 2, 3, 10, 12 and 13.

FIGS. 10, 12 and 13 depict various embodiments of an H-matrix generated in accordance with the principles of the present invention. In each of FIGS. 10, 12 and 13, the H-matrix is shown comprising a plurality of subsets arranged in a plurality of rows and columns. In addition, each of at least one of the rows comprises, in part, multiple iterations of one subset of the plurality of subsets, whereas the remainder of the rows comprises, in part, a cyclic permutation of all of the remaining subsets of the plurality of subsets.

In the example depicted in FIG. 10, one H-matrix is shown including a plurality of 2×26 modular matrices M0–M5, a plurality of 2×2 matrices V0–V1, and matrix I12, which represents a 12×12 identity matrix. As can be seen, the top row of the H-matrix in FIG. 10 comprises, in part, multiple iterations of subset M0 and the remainder of the rows comprises, in part, a cyclic permutation of the remaining subsets M1–M5. In addition to comprising the subsets M1–M5, the rows of the H-matrix also comprise various iterations of the V0 and V1 matrices, as well as the I12 matrix. Other examples of H-matrices generated according to the principles of the present invention are depicted in FIGS. 12 and 13. Similar to the example shown in FIG. 10, the embodiments depicted in FIGS. 12 and 13 also include a plurality of rows and columns with the top row comprising multiple iterations of one subset and with the remainder of the rows comprising a cyclic permutation of the remaining subsets. Furthermore, although each of the embodiments shown in FIGS. 10, 12 and 13 depicts a top row comprising, in part, multiple iterations of one subset, it is to be understood that the row comprising, in part, multiple iterations of one subset is not limited to the top row of the H-matrix and, to the contrary, any one of the rows of the H-matrix may comprise, in part, multiple iterations of one subset with the remaining rows comprising, in part, a cyclic permutation of the remaining subsets. Also, although each of the embodiments shown in FIGS. 10, 12 and 13 depict a particular arrangement of rows and columns, it is to be understood that each row is interchangeable with any other row, and likewise any column is interchangeable with any other column.

In addition, the H-matrix of the present invention may be implemented so that each subset M0–M5 is iterated no more than five times. For example, in the H-matrix depicted in FIG. 10, each of subsets M0, M1, M2, M3, M4 and M5 is iterated five times each on the left-hand side of the H-matrix before iterating matrices V0 and V1. Similarly, FIGS. 12 and 13 depict H-matrices comprising subsets M0, M1, M2, M3, M4 and M5 each iterated five times with matrices V0, V1 and V2 interposed between the subsets. As a result of the utilization of the modular structure described above, the H-matrix of the present invention becomes much easier to implement within its particular host computer system.

Figure 4:
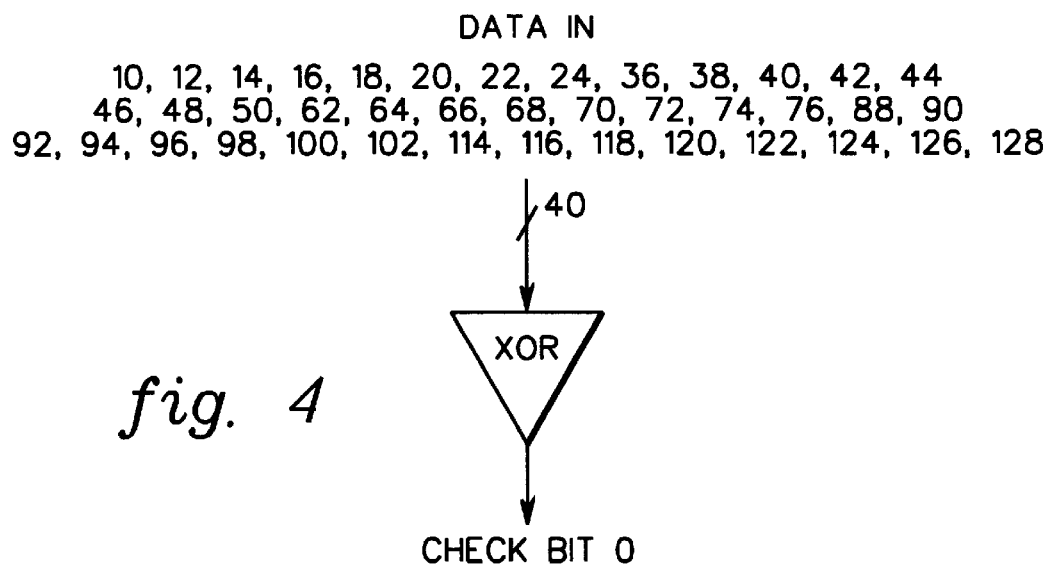
FIG. 4 depicts one example of a portion of the circuit of FIG. 3 used to generate a single check bit.

The H-matrix of FIG. 10, when expanded, has 146 columns and 12 rows. The first 134 columns (M0–M5 and V0 and V1) are designated as data columns and the last 12 columns (I12) are designated as ECC check columns. Furthermore, each row of the H-matrix is associated with and used to generate a single check bit. More specifically, each instance of a 1 in a row designates a data bit which is to be included in a specific group of data bits. This specific group of data bits, in turn, is used to generate a corresponding check bit. In particular, a check bit is generated by performing an exclusive OR (XOR) operation on each of the data bits of the data word as specified by the particular row of the H-matrix corresponding to that particular check bit. For example, FIG. 4 depicts a portion of a circuit used to generate check bit 0 and in this regard indicates that an XOR operation is performed on data bits 10, 12, 14, 16, 18, 20, 22, 24, 36, 38, 40, 42, 44, 46, 48, 50, 62, 64, 66, 68, 70, 72, 74, 76, 88, 90, 92, 94, 96, 98, 100, 102, 114, 116, 118, 120, 122, 124, 126 and 128. The result of this XOR operation represents check bit 0. Consistent with FIG. 4, an examination of row 0 of the H-matrix of FIG. 10, which corresponds to check bit 0, reveals that a 1 resides in each of columns 10, 12, 14, 16, 18, 20, 22, 24, 36, 38, 40, 42, 44, 46, 48, 50, 62, 64, 66, 68, 70, 72, 74, 76, 88, 90, 92, 94, 96, 98, 100, 102, 114, 116, 118, 120, 122, 124, 126 and 128. This procedure is then repeated with respect to each row of the H-matrix to generate a total of 12 check bits associated with the data word.

Figure 3:
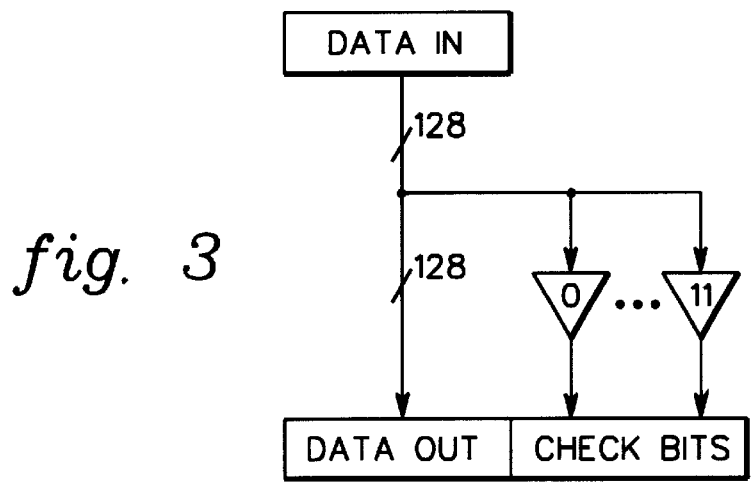
FIG. 3 depicts one example of a circuit used to generate a plurality of check bits associated with a data word in accordance with the present invention.

FIG. 3 depicts a partial circuit diagram of the check bit generation described above including the generation of each of check bits 0–11. In the embodiment depicted in FIG. 3, a 128 bit data word is written to memory together with 12 check bits generated in accordance with the principles of the present invention. As indicated above, each of the 12 check bits of FIG. 3 is generated by XORing a group of data bits selected according to the H-matrix. Subsequently, the 12 check bits, along with the 128 data bits are written to memory until a read operation is performed.

Figure 5:
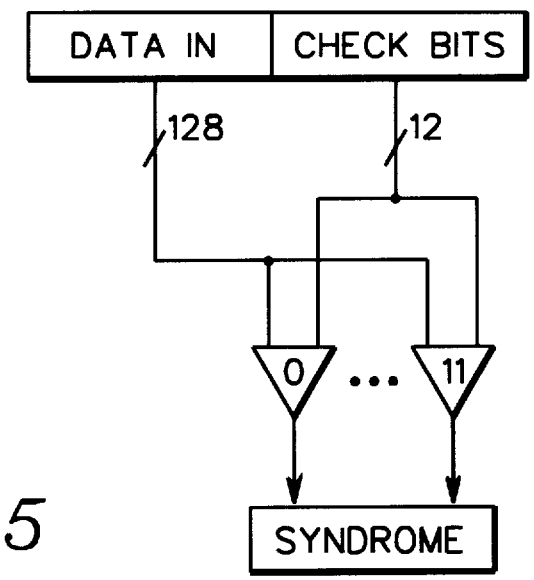
FIG. 5 depicts one example of a circuit used to generate a plurality of syndrome bits associated with the data word in accordance with the present invention.
Figure 6:
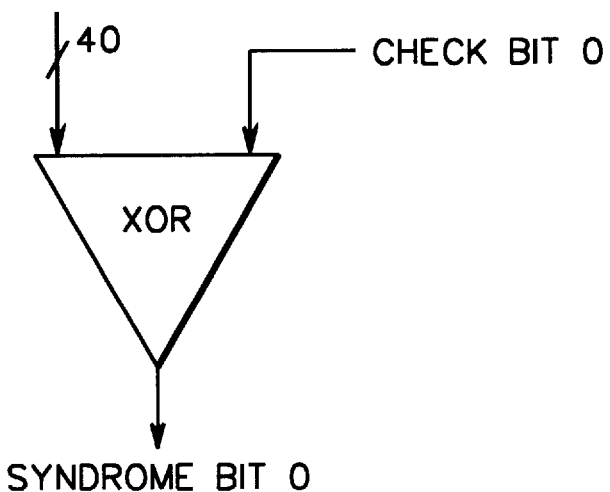
FIG. 6 depicts one example of a portion of the circuit of FIG. 5 used to generate a single syndrome bit.

Subsequent to the generation of the check bits and upon the occurrence of a read operation, a 12 bit syndrome is generated. As depicted in FIG. 5, when a read operation occurs, the 128 data bits together with the 12 associated check bits, previously written to memory as described above, are read from memory. After being read from memory, an XOR operation is again performed to generate the syndrome except that in this instance the XOR operation is performed on the group of data bits determined according to the H-matrix, as well as the corresponding check bit. Specifically, as shown in FIG. 6, an XOR operation is performed on data bits 10, 12, 14, 16, 18, 20, 22, 24, 36, 38, 40, 42, 44, 46, 48, 50, 62, 64, 66, 68, 70, 72, 74, 76, 88, 90, 92, 94, 96, 98, 100, 102, 114, 116, 118, 120, 122, 124, 126 and 128, as well as check bit 0. The result of this XOR operation represents syndrome bit 0. In addition, similar to the generation of the check bits, the data bits used in the XOR are determined according to the H-matrix. In other words, each of the data bits listed in FIG. 6 is shown as having a 1 in row 0 of the H-matrix of FIG. 10, and is also included in the group of data bits used to generate check bit 0 as described above. This procedure is then repeated with respect to each row of the H-matrix and with each corresponding check bit to generate a total of 12 syndrome bits associated with the data word.

Figure 7:
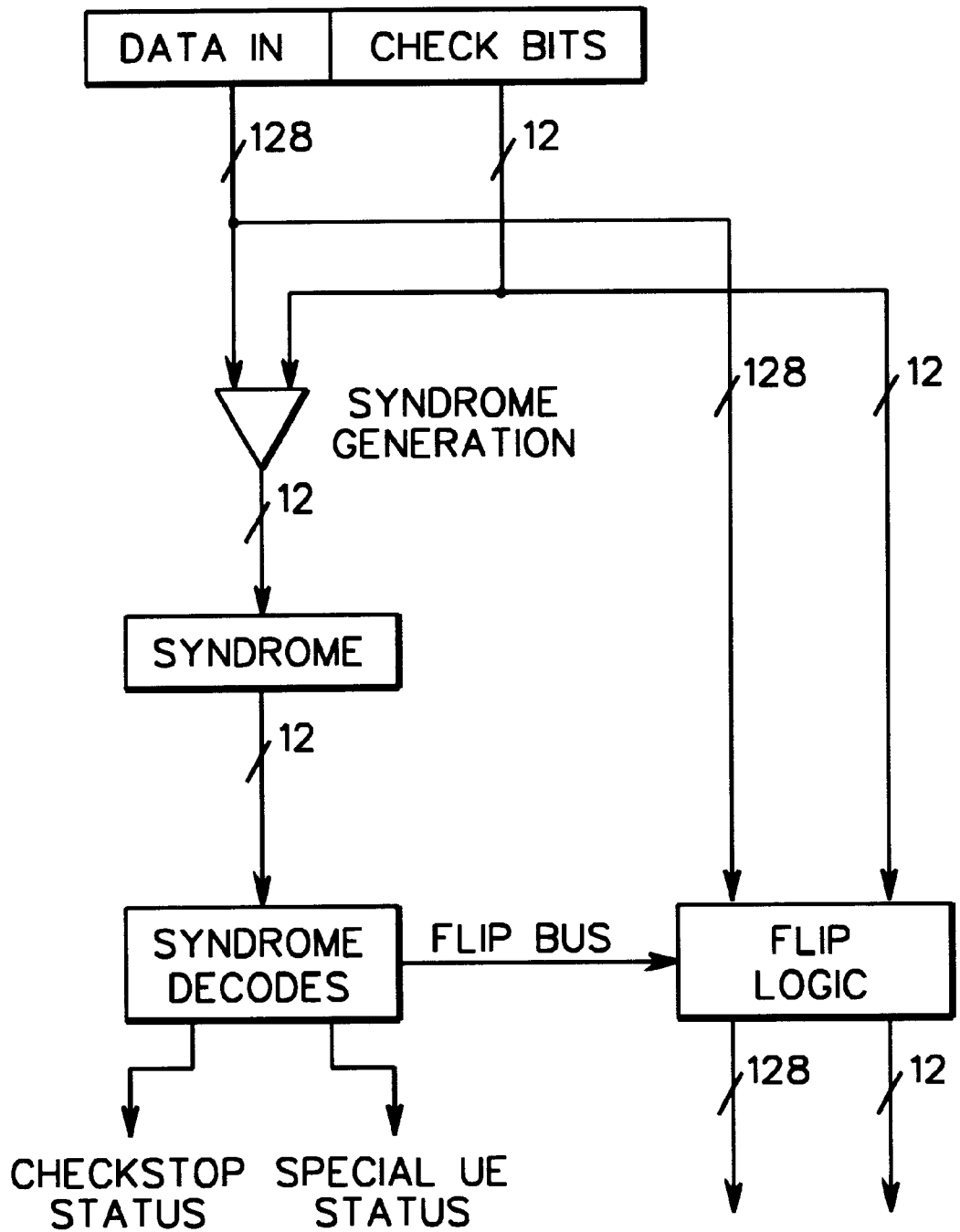
FIG. 7 depicts one example of a circuit used to decode the syndrome and correct any bits determined to be in error in accordance with the present invention.

After generation, as shown in FIG. 7, the syndrome is decoded to determine the presence of any erroneous data or check bits. In accordance with the principles of the invention, subsequent to syndrome decoding, any single error or double errors in a single symbol are corrected, as depicted in the FLIP LOGIC box of FIG. 7. Syndrome decoding is discussed below with reference to FIGS. 8 and 11, and error correction is discussed with reference to FIG. 9.

FIG. 11 depicts one embodiment of a syndrome decode table used to decode the syndrome generated above. Although alternate embodiments may exist, this particular decode table corresponds to the H-matrix of FIG. 10 and is comprised of a 12 row by 73 column table. Each of the 73 columns, in turn, corresponds to a particular symbol or chip of the data word. For instance, column 0 corresponds to symbol 0, and likewise, column 11 corresponds to symbol 11. Furthermore, each column is comprised of 3 sub-columns, with the first sub-column corresponding to the first bit of the symbol to which the column corresponds, the second sub-column corresponding to the second bit of the symbol to which the column corresponds, and the third sub-column corresponding to both the first and the second bits of the symbol to which the column corresponds. For instance, the first sub-column of column 1 corresponds to the first bit of symbol 1, the second sub-column of column 1 corresponds to the second bit of symbol 1, and the third sub-column of column 1 corresponds to both the first and the second bit of symbol 1.

The first two sub-columns of each column of the decode table are determined according to the H-matrix. Specifically, the first two sub-columns of each column are identical to their corresponding columns of the H-matrix. For example, the first sub-column of column 0 of the decode table is equal to column 0 of the H-matrix. Similarly, the second sub-column of column 2 of the decode table is equal to column 5 of the H-matrix. The third sub-columns of decode table columns, on the other hand, are determined by XORing the first and second sub-column of the respective column. Thus, XORing the first and second sub-columns of row 0, column 0 (i.e., 0 and 0) results in the 0 residing in the third sub-column of row 0, column 0, and likewise XORing the first and second sub-columns of row 2, column 1 (i.e., 1 and 0) results in the 1 residing in the third sub-column of row 2, column 1.

As noted above, the decode table of FIG. 10 comprises 12 rows. Each of these rows, in turn, corresponds to one bit of the 12 bit syndrome. Thus in this embodiment, the top row of the decode table corresponds to syndrome bit 0, and similarly, the bottom row of the decode table corresponds to syndrome bit 11.

After generating the syndrome bits, the syndrome is compared against the individual syndrome patterns in the syndrome decode table to determine whether a bit in error exists, and, if an error exists, to determine the location of any single symbol errors (i.e., either one error or two errors located on a single symbol), or the existence of any multiple symbol errors (i.e., errors existing on more than one symbol). First, if each and every bit of the syndrome is zero, no error exists and the data word requires no modification. If, however, any bit of the syndrome is not zero, the syndrome must be compared with the sub-columns of the columns of the decode table to determine the location of single symbol errors or in the alternative to detect the presence of multiple symbol errors.

Figure 8:
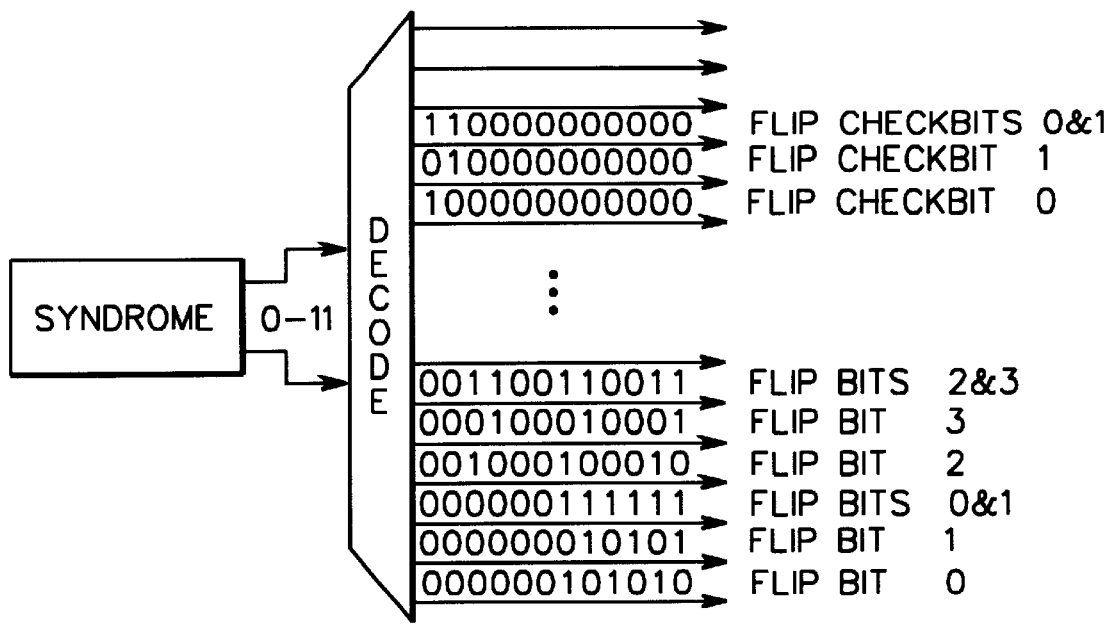
FIG. 8 depicts one example of a block diagram of the logic used to decode the syndrome of FIG. 5.

FIG. 8 depicts the logic used in determining the location of single symbol errors and the presence of multiple symbol errors. In this regard, each of the syndrome patterns shown in FIG. 8 corresponds to a sub-column of the decode table of FIG. 11, and as alluded to above, each sub-column indicates that either a single bit is in error, or that two bits in a single symbol are in error. To illustrate, sub-column 0 indicates that the first bit of symbol 0 is in error, sub-column 1 indicates that the second bit of symbol 0 is in error, and sub-column 3 indicates that both the first and the second bits of symbol 0 are in error. Accordingly, the generated syndrome may be compared against the syndrome patterns shown in FIG. 8 to determine the location of any single symbol errors. For instance, a generated syndrome of 000000101010 matches with the bottom syndrome pattern and indicates that the first bit of symbol 0, or in other words, bit 0 is in error. Similarly, a generated syndrome of 001100110011 matches with the sixth syndrome pattern from the bottom and indicates that both the first and the second bit of symbol 1, or in other words, bits 2 and 3 are in error. If, however, there are no matches between the generated syndrome and the sub-columns of the decode table and if all of the syndrome bits are not 0, then a multiple symbol error is determined to exist and an appropriate error message must be generated, as discussed in greater detail below.

Figure 9:
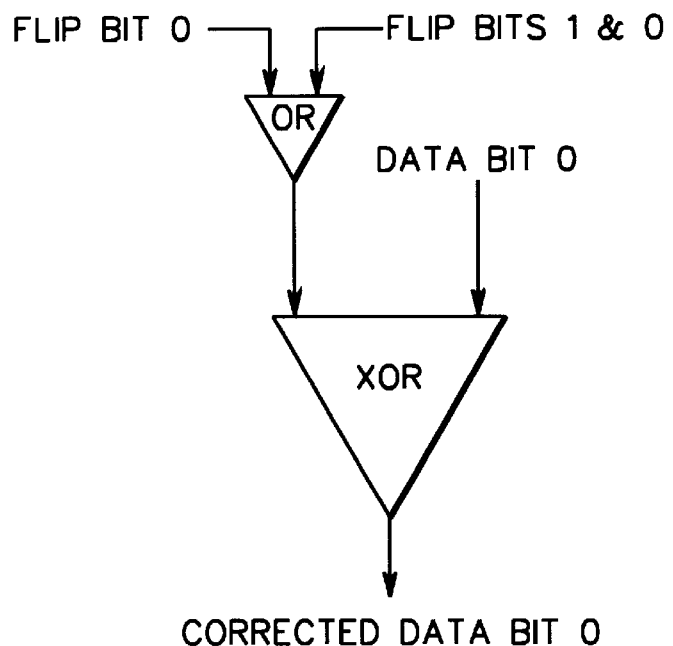
FIG. 9 depicts one example of a circuit used to correct a bit determined to be in error.

Subsequent to decoding the syndrome, uncorrectable error messages are generated in response to the detection of a multiple symbol error. Additionally, any single symbol errors are also corrected at this time. FIG. 9 depicts one embodiment of a circuit used to correct bits determined to be in error. More specifically, the inputs to the OR operation correspond to scenarios that affect the bit at issue. In this case, the bit at issue is bit 0 and the scenarios that affect bit 0 are if bit 0 is in error or if bits 0 and 1 are in error. Each of these inputs is set to 1 if the respective scenario is determined to exist by syndrome decoding as discussed above, otherwise the input is set to 0. Thus, in this example if bit 0 is determined to be in error, that particular input is set to 1. Subsequently, the OR of the two inputs is XORed with the data bit at issue to either correct an erroneous data bit, or leave unmodified a data bit determined to be correct. Hence, in this instance, the OR of the two inputs, or 1, is XORed with data bit 0 to complement data bit 0, thereby producing a corrected data bit 0.

Figure 14:
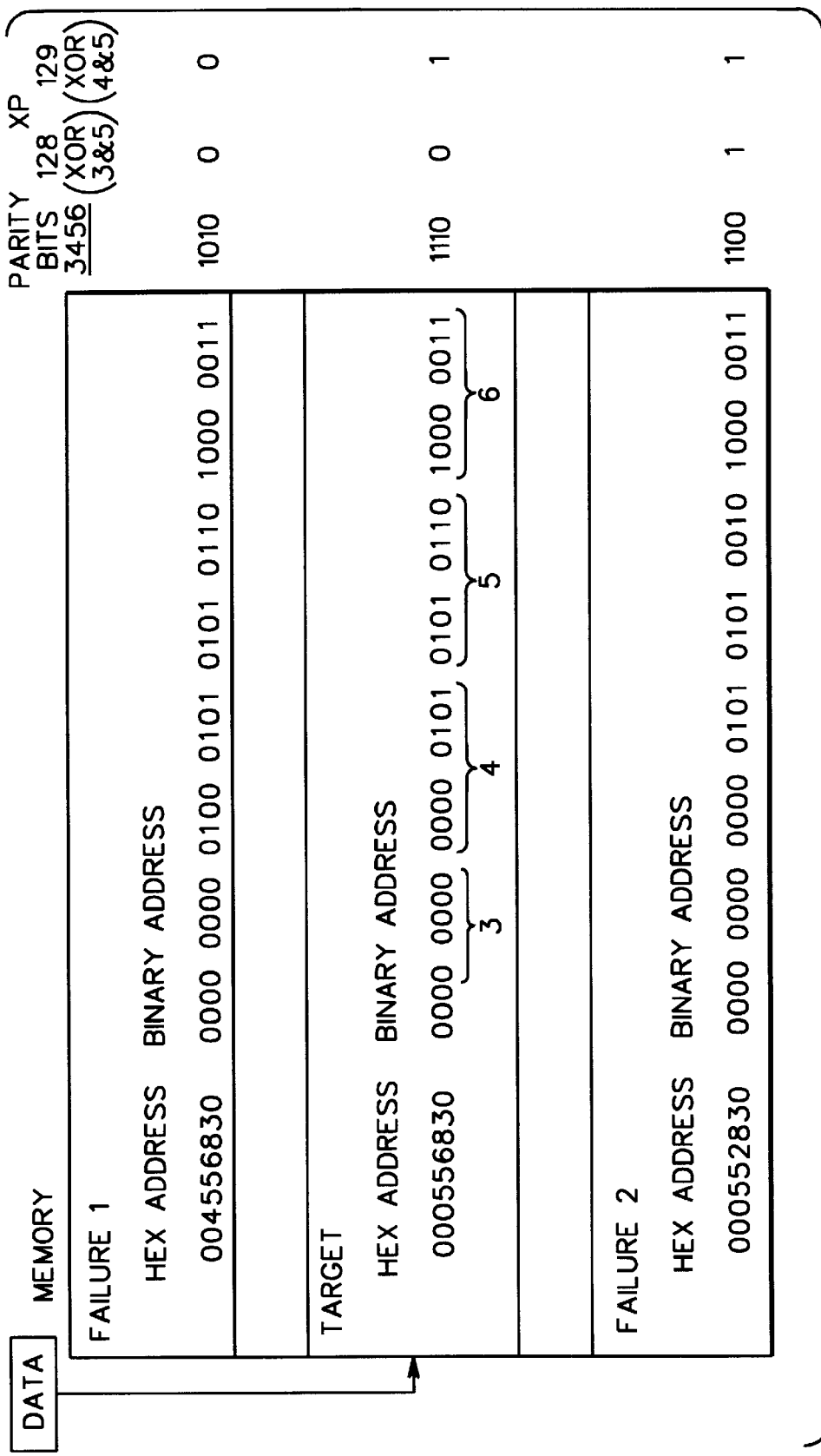
FIG. 14 depicts one example of the generation of a plurality of parity bits and a plurality of extra parity bits in one embodiment of address protection in accordance with the principles of the present invention.
Figure 15:
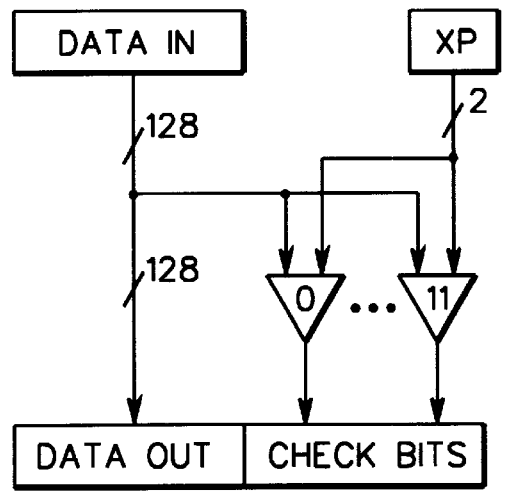
FIG. 15 depicts one example of a circuit which can be used to generate a plurality of check bits for the address protection embodiment of FIG. 14 in accordance with the principles of the present invention.
Figure 16:
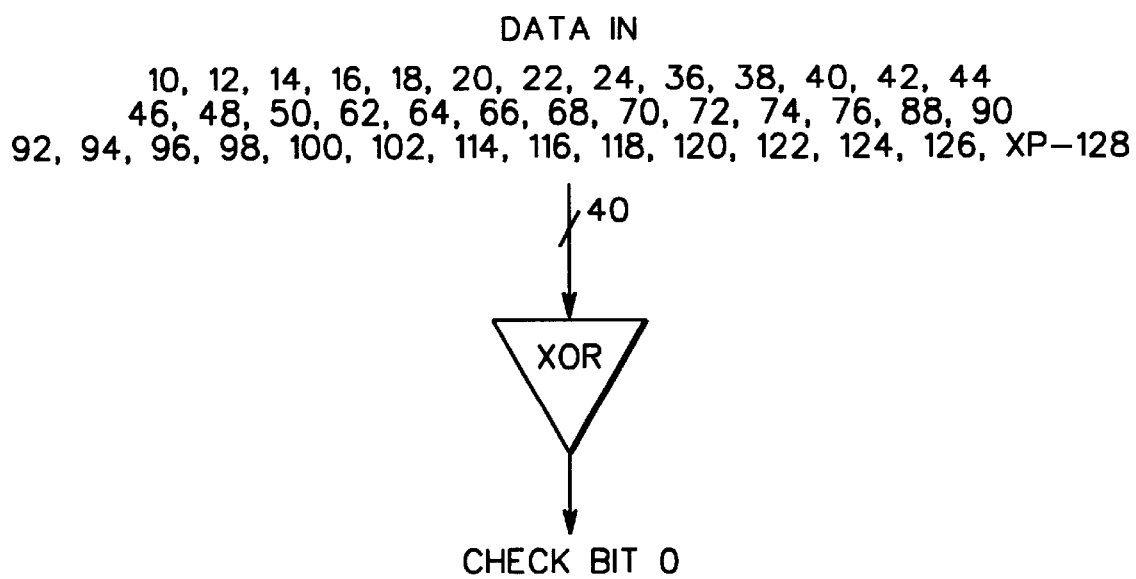
FIG. 16 depicts one example of a portion of the circuit of FIG. 15 which can be used to generate a single check bit for the address protection embodiment of FIG. 14 in accordance with the principles of the present invention.

In accordance with another aspect of the present invention, address faults from data transmitted to or retrieved from an incorrect memory address are detected. The occurrence of such an address fault is illustrated below with reference to FIG. 14. In FIG. 14, data intended to be stored at a target location, or memory address 000556830 (hex), is erroneously stored to failure location 1, or memory address 004556830 (hex). This type of error could occur due to, for instance, the failure of an address bit corresponding to the third digit in the memory address which results in 0 being changed to 4. Similarly, as another example, the failure of an address bit corresponding to the sixth digit in the memory address resulting in 6 being changed to 2 would result in the storage of data to failure location 2, or memory address 000552830 (hex).

To detect such an address fault, at least one data bit of the H-matrix is intentionally left unused. Instead of holding data, these unused data bits are replaced with at least one extra parity bit which corresponds to the address bits of the target location. In one embodiment, utilizing a 130 bit data word, data bits 128 and 129 are left unused and are instead replaced with the above-mentioned extra parity bits. Thus, in this example, one extra parity bit corresponds to data bit 128 and the other extra parity bit corresponds to data bit 129. Both, in turn, are used in place of original data bits 128 and 129 during check bit and syndrome generation. However, these extra parity bits need not be stored with the data. The generation of such extra parity bits is described below with reference to FIG. 14.

Referring again to FIG. 14, the memory address of the target location 000556830 (hex) may be represented in binary as: 0000 0000 0000 0101 0101 0110 1000 0011. In the embodiment depicted, only the rightmost bit of the first hex digit (0), and the next seven nibbles (i.e., a collection of four bits) (0000 0000 0101 0101 0110 1000 0011) are utilized. In this particular system, the remaining bits are utilized for other purposes and are not further discussed. In addition, it is to be understood that although a particular arrangement of bits is described as being utilized for illustrative purposes in this embodiment, the present invention is not to be construed as being limited to only the utilization of those particular bits. Rather, any arrangement of bits may be utilized without departing from the principles of the instant invention.

As will be discussed below, these address bits are utilized to generate a group of parity bits in a manner such that each parity bit is associated with a group of address bits. In this embodiment, four parity bits (3–6) are implemented such that: parity bit 3 is associated with the rightmost bit of the first hex digit and all four bits of the second hex digit (or the second nibble); parity bit 4 is associated with the third and fourth nibbles; parity bit 5 is associated with the fifth and sixth nibbles; and parity bit 6 is associated with the seventh and eighth nibbles. Therefore in the instant example, and with respect to the target memory location shown in FIG. 14, the rightmost bit (0 binary) of the second hex digit (0 hex) and the third nibble (0 hex and 0000 binary) are associated with parity bit 3. Similarly, parity bit 5 of the target location is associated with the fifth (0101 binary) and sixth (0110 binary) nibbles of the memory location 000556830 (hex).

Then to generate the aforementioned parity bits, each parity bit is set to either 1 or 0, so that a set of bits comprising the instant parity bit along with the address bits associated therewith has an odd number of 1's in a system having odd parity and an even number of 1's in a system having even parity. Thus, in the instant example, utilizing odd parity, parity bit 4 of the target memory location is set to 1 so that the set comprising parity bit 4 and address nibbles 3 (0000) and 4 (0101) has an odd number of 1's.

Similarly, again using odd parity, parity bit 6 of the target memory location is set to 0 so that the set comprising parity bit 6 and address nibbles 7 (1000) and 8 (0011) has an odd number of 1's. These parity bits are then used to generate at least one extra parity bit, as discussed below.

Subsequent to the generation of the parity bits, at least one extra parity bit is generated. In one embodiment, two extra parity bits are generated with each being associated with a subgroup of the parity bits discussed above. In particular, a first extra parity bit is associated with parity bits 3 and 5 and results from an exclusive-OR (XOR) function performed thereon. A second extra parity bit is associated with parity bits 4 and 6, and like the first extra parity bit, is generated by performing an XOR function on parity bits 4 and 6. This procedure is utilized to generate the extra parity bits used in check bit generation (i.e., extra storage parity bits) as well as the extra parity bits used in syndrome generation (i.e., extra retrieval parity bits), as discussed below with reference to FIGS. 15–18.

Similar to the check bit generation in the embodiments lacking the address protection or address fault detection aspect of the present invention (see, FIGS. 3 and 4), a set of data bits of a data word are selected according to an H-matrix and XORed to produce a check bit. However, in embodiments having the address fault detection feature of the present invention, at least one unused data bit is replaced with one of the extra parity bits discussed above. In this manner and in accordance with the principles of the present invention, address fault detection may be imparted to the ECC-protected data, without having to store or retrieve additional bits to memory.

In one embodiment and as one example, data bits 128 and 129 are left unused. Then, the extra parity bits are substituted in place of the unused data bits to generate the ECC check bits. For instance, referring to FIGS. 15 and 16, check bit 0 is generated by performing an XOR function on data bits 10, 12, 14, 16, 18, 20, 22, 24, 36, 38, 40, 42, 44, 46, 48, 50, 62, 64, 66, 68, 70, 72, 74, 76, 88, 90, 92, 94, 96, 98, 100, 102, 114, 116, 118, 120, 122, 124, and 126, as dictated by the H-matrix of FIG. 10. However, instead of including the data stored in data bit 128 (as was the case with embodiments lacking the address fault detection feature), the first storage extra parity bit is included in the XOR operation. In this manner, address protection is incorporated into the generated error correction code via the extra parity bits substituted in place of the unused data bits, without having to include an additional address parity bit. After generating the check bits, the syndrome having this address protection feature is generated in a similar manner, as described below.

Figure 17:
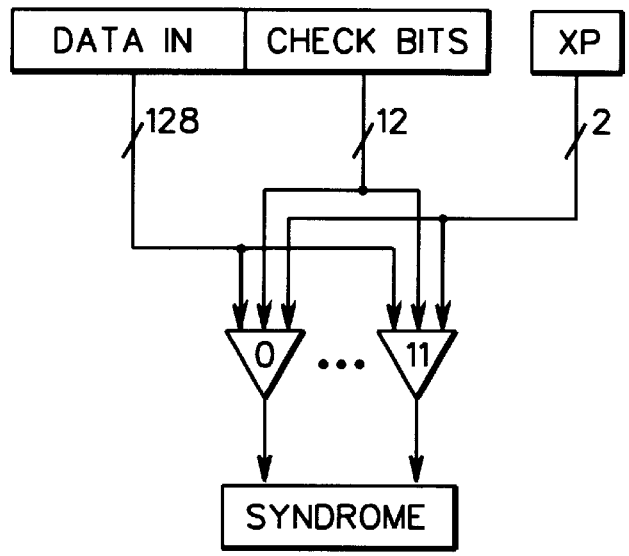
FIG. 17 depicts one example of a circuit which can be used to generate a plurality of syndrome bits for the address protection embodiment of FIG. 14 in accordance with the principles of the present invention.
Figure 18:
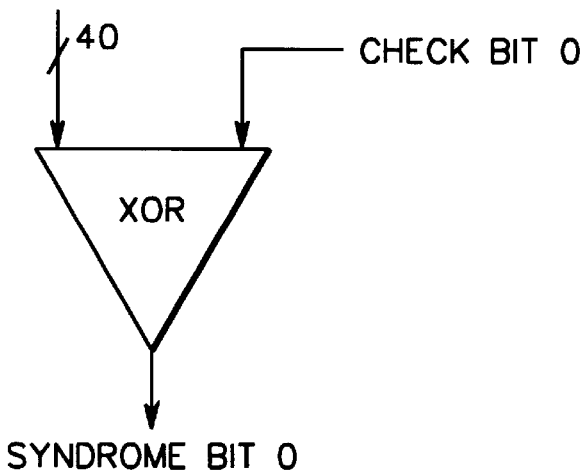
FIG. 18 depicts one example of a portion of the circuit of FIG. 17 which can be used to generate a single syndrome bit for the address protection embodiment of FIG. 14 in accordance with the principles of the present invention.

Like the generation of the check bits in embodiments having the address protection or address fault detection aspect of the present invention, the syndrome is also generated by substituting the extra parity bits in place of the unused data bits. Referring to FIG. 17 and 18, the data bits dictated by the H-matrix (without the unused data bits) are XORed along with their corresponding check bit and with the extra parity bits substituted in place of the unused data bits. Thus in this example, an XOR is performed on data bits 10, 12, 14, 16, 18, 20, 22, 24, 36, 38, 40, 42, 44, 46, 48, 50, 62, 64, 66, 68, 70, 72, 74, 76, 88, 90, 92, 94, 96, 98, 100, 102, 114, 116, 118, 120, 122, 124, and 126; check bit 0; and the extra retrieval parity bit substituted in place of data bit 128 to produce the corresponding syndrome bit 0. These syndrome bits are then decoded to detect any correctable and uncorrectable memory data failures (in the embodiments lacking the address protection feature as well as the embodiments having the address protection feature) and to detect any uncorrectable errors, and identify address faults from among the uncorrectable errors (in embodiments having the address protection feature), as discussed below.

Subsequent to the generation of the syndrome bits, the syndrome is decoded to detect any correctable memory data failures (e.g. one or more bit failures occurring in a single symbol); detect uncorrectable memory data failures (e.g. multiple symbol failures); and, in the case of embodiments having the address fault detection feature of the instant invention, identify uncorrectable errors resulting from address faults. The syndrome in embodiments having the address fault detection feature is decoded in a manner similar to embodiments lacking the address fault detection feature (as previously described with reference to FIGS. 8 and 11). Therefore, only the differences between the two will be discussed. In this regard, the columns and sub-columns of the syndrome decode table of FIG. 11 corresponding to the unused data bits (bits 128 and 129 in this example) are generated in the manner described previously, except with the extra parity bits (i.e. the extra storage parity bits) substituted in place of the unused data bits. Hence, because each extra parity bit is associated with an address, a discrepancy will exist between the extra parity bits generated during storage (i.e. extra storage parity bits) and between the extra parity bits generated during retrieval (i.e. extra retrieval parity bits) when an address fault occurs. As a result, decoding a syndrome generated with these extra storage and retrieval parity bits will reveal an error in either or both of the unused/extra parity bits (i.e. bits 128 and 129). For example, referring to FIG. 19, in this example, a syndrome of 101110101100 indicates an address fault in bit 128. Similarly, syndromes of 011001011000 and 110111110100 indicate errors in bit 129 and bits 128 and 129, respectively.

Subsequently, upon the detection of an address fault, the computing system generates a checkstop and may take any additional actions, as necessary. Furthermore, by isolating the address faults to either one or both data bits, the detected faults may be isolated to a group of specific address bits, as discussed below.

In addition, the address fault detection feature may also be disabled. More specifically, in one embodiment, to disable such feature, each of the extra storage and retrieval parity bits are forced to a constant, for example, zero. Furthermore, such disabling may be programmable (e.g., by utilizing a switch or the like).

As described above and in accordance with the principles of the present invention, each checkstop condition is generated according to a discrepancy between the extra storage parity bits and the extra retrieval parity bits. It therefore follows that the address error may be isolated to the address bits associated with the extra parity bit responsible for generating the checkstop condition. For instance in this example, an address fault or checkstop condition resulting from extra parity bit 128 indicates that one or more of the address bits associated with the parity bits used to generate extra parity bit 128 have failed. More specifically, referring again to FIG. 14, a checkstop condition resulting from extra parity bit 128 indicates that one or more of the address bits used to generate parity bits 3 and 5 (i.e., the right most bit of nibble 1, nibble 2, and nibbles 5 and 6) have failed. Similarly, a checkstop condition resulting from extra parity bit 129 indicates that one or more bits used to generate parity bits 4 and 6 (i.e., nibbles 3, 4, 7 and 8) have failed. In this manner, an address fault may be isolated to a specific group of address bits.

Described in detail above are computer system and logic used in one embodiment of the present invention for detecting address faults in an ECC-protected memory. As describe herein, in accordance with one aspect of the invention, any uncorrectable errors occurring during the transmission of a data word are detected. Then, a determination is made as to whether any of these uncorrectable errors are address faults or are instead some other type of uncorrectable error, such as a memory data failure. In addition, in some embodiments, the address fault is isolated to a particular subgroup of address bits corresponding to an address to which the data word was intended to be transmitted. In this manner, a faulty address bit may be isolated to a particular subgroup of bits. Furthermore, address faults are not only detected, but also distinguished from other types of uncorrectable errors, such as memory data failures, all without requiring any address bits to be stored to memory.

Furthermore, it should be noted that the specific OR or XOR operations described in the embodiments above are utilized for exemplary reasons only, and that the present invention is not to be construed as being limited to only those specific operations. To the contrary, other operations, for example the complements of the OR and XOR operations, may just as easily be implemented without departing from the principles of the instant invention.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are merely exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of identifying address faults, said method comprising:
    selecting a group of data bits to comprise a data word, the selecting being according to a H-matrix, and further selecting at least one unused data bit according to the H-matrix;
    generating at least one extra storage parity bit corresponding to an address to which said data word is intended to be transmitted to;
    generating a plurality of check bits by substituting said at least one extra storage parity bit in place of said at least one unused data bit;
    writing said data word and said check bits to memory;
    detecting an uncorrectable error during transmission of said data word; and
    determining whether said uncorrectable error is an address fault using said check bits.

2. The method of claim 1, wherein said uncorrectable error is detected according to an error correction code.

3. The method of claim 2, further comprising generating said error correction code according to a H-matrix comprising a plurality of subsets arranged in a plurality of rows and columns, wherein each of at least one row of said plurality of rows comprises, in part, multiple iterations of one subset of said plurality of subsets, and a remainder of said plurality of rows comprises, in part, a cyclic permutation of all remaining subsets of said plurality of subsets.

4. The method of claim 1, further comprising isolating said address fault to a subgroup of address bits of a group of address bits corresponding to an address to which said data word was intended to be transmitted, wherein said subgroup of address bits contains at least one faulty bit.

5. The method of claim 1, wherein said uncorrectable error comprises address faults as well as other uncorrectable errors.

6. The method of claim 1, wherein said uncorrectable error comprises address faults and memory data failures, and wherein said determining further comprises distinguishing said address faults from said memory data failures.

7. The method of claim 1, further comprising:
generating at least one extra retrieval parity bit corresponding to an address from which said data word is intended to be transmitted from; and
identifying said address fault by utilizing said extra storage and extra retrieval parity bits.

8. The method of claim 7, wherein said address to which said data word is intended to be transmitted to corresponds to a plurality of subgroups of address bits, with each subgroup of address bits corresponding to a parity bit of a group of parity bits, and wherein each extra storage parity bit has associated therewith a subgroup of parity bits of said group of parity bits, said generating at least one extra storage parity bit comprising:
setting each of said parity bits to 1 or 0 so that a set comprising said parity bit and said subgroup of address bits corresponding to said parity bit has an odd number of 1's for an odd parity computer system and an even number of 1's for an even parity computer system; and
performing an exclusive OR function on said subgroup of parity bits associated with said extra storage parity bit thereby resulting in said at least one extra storage parity bit.

9. The method of claim 7, wherein said address from which said data word is intended to be transmitted from corresponds to a plurality of subgroups of address bits, with each subgroup of address bits corresponding to a parity bit of a group of parity bits, and wherein each extra retrieval parity bit has associated therewith a subgroup of parity bits of said group of parity bits, said generating at least one extra retrieval parity bit comprising:
setting each of said parity bits to 1 or 0 so that a set comprising said parity bit and said subgroup of address bits corresponding to said parity bit has an odd number of 1's for an odd parity computer system and an even number of 1's for an even parity computer system; and
performing an exclusive OR function on said subgroup of parity bits associated with said extra retrieval parity bit thereby resulting in said at least one extra retrieval parity bit.

10. The method of claim 7, further comprising:
retrieving said data word and said plurality of check bits from memory;
generating a syndrome by substituting said at least one extra retrieval parity bit in place of said at least one unused data bit and performing an exclusive OR function on said remainder of said data bits of said group of data bits, said at least one extra storage parity bit, and a check bit of said plurality of check bits corresponding to said group of data bits; and
decoding said syndrome to determine said address fault.

11. The method of claim 10, wherein said decoding comprises indicating an address fault condition identifying a subgroup of address bits of a group of address bits corresponding to an address to which said data word was intended to be transmitted, wherein said subgroup of address bits contains at least one faulty bit.

12. The method of claim 7, further comprising:
forcing said at least one extra storage parity bit and said at least one extra retrieval storage parity bit to a constant to disable address fault detection.

13. The method of claim 12, wherein said forcing comprises programmable forcing.

14. A system for identifying address faults, said system comprising:
means for selecting a group of data bits according to a H-matrix, the group of data bits-comprising a data word, and means for selecting at least one unused data bit according to the H-matrix;
means for generating at least one extra storage parity bit corresponding to an address to which said data word is intended to be transmitted to;
means for generating a plurality of check bits by substituting said at least one extra storage parity bit in place of said at least one unused data bit;
means for writing said data word and said check bits to memory;
means for detecting an uncorrectable error during transmission of the data word; and
means for determining whether said uncorrectable error is an address fault using said check bits.

15. The system of claim 14, wherein said uncorrectable error is detected according to an error correction code.

16. The system of claim 15, further comprising means for generating said error correction code according to a H-matrix comprising a plurality of subsets arranged in a plurality of rows and columns, wherein each of at least one row of said plurality of rows comprises, in part, multiple iterations of one subset of said plurality of subsets, and a remainder of said plurality of rows comprises, in part, a cyclic permutation of all remaining subsets of said plurality of subsets.

17. The system of claim 14, further comprising means for isolating said address fault to a subgroup of address bits of a group of address bits corresponding to an address to which said data word was intended to be transmitted, wherein said subgroup of address bits contains at least one faulty bit.

18. The system of claim 14, wherein said uncorrectable error comprises address faults as well as other uncorrectable errors.

19. The system of claim 14, wherein said uncorrectable error comprises address faults and memory data failures, and wherein said means for determining further comprises means for distinguishing said address faults from said memory data failures.

20. The system of claim 14, further comprising:
means for generating at least one extra retrieval parity bit corresponding to an address from which said data word is intended to be transmitted from; and
means for identifying said address fault by utilizing said extra storage and extra retrieval parity bits.

21. The system of claim 20, wherein said address to which said data word is intended to be transmitted to corresponds to a plurality of subgroups of address bits, with each subgroup of address bits corresponding to a parity bit of a group of parity bits, and wherein each extra storage parity bit has associated therewith a subgroup of parity bits of said group of parity bits, said means for generating at least one extra storage parity bit comprising:

means for setting each of said parity bits to 1 or 0 so that a set comprising said parity bit and said subgroup of address bits corresponding to said parity bit has an odd number of 1's for an odd parity computer system and an even number of 1's for an even parity computer system; and means for performing an exclusive OR function on said subgroup of parity bits associated with said extra storage parity bit thereby resulting in said at least one extra storage parity bit.

22. The system of claim 20, wherein said address from which said data word is intended to be transmitted from corresponds to a plurality of subgroups of address bits, with each subgroup of address bits corresponding to a parity bit of a group of parity bits, and wherein each extra retrieval parity bit has associated therewith a subgroup of parity bits of said group of parity bits, said means for generating at least one extra retrieval parity bit comprising:

means for setting each of said parity bits to 1 or 0 so that a set comprising said parity bit and said subgroup of address bits corresponding to said parity bit has an odd number of 1's for an odd parity computer system and an even number of 1's for an even parity computer system; and means for performing an exclusive OR function on said subgroup of parity bits associated with said extra retrieval parity bit thereby resulting in said at least one extra retrieval parity bit.

23. The system of claim 20, further comprising:

means for retrieving said data word and said plurality of check bits from memory;

means for generating a syndrome by substituting said at least one extra retrieval parity bit in place of said at least one unused data bit and for performing an exclusive OR function on said remainder of said data bits of said group of data bits, said at least one extra storage parity bit, and a check bit of said plurality of check bits corresponding to said group of data bits; and means for decoding said syndrome to determine said address fault.

24. The system of claim 23, wherein said means for decoding comprises means for indicating an address fault condition identifying a subgroup of address bits of a group of address bits corresponding to an address to which said data word was intended to be transmitted, wherein said subgroup of address bits contains at least one faulty bit.

25. The system of claim 20, further comprising:

means for forcing said at least one extra storage parity bit and said at least one extra retrieval storage parity bit to a constant to disable address fault detection.

26. The system of claim 25, wherein said forcing comprises programmable forcing.

27. A system for identifying address faults, said system comprising:

a controller adapted to:
select a group of data bits to comprise a data word, the selection being according to a H-matrix, and further select at least one unused data bit according to the H-matrix;

generate at least one extra storage parity bit corresponding to an address to which said data word is intended to be transmitted to;

generate a plurality of check bits by substituting said at least one extra storage parity bit in place of said at least one unused data bit;

write said data word and said check bits to memory; and wherein the controller is further adapted to detect an uncorrectable error during transmission of the data word; and determine whether said uncorrectable error is an address fault using said check bits.

28. An article of manufacture comprising:

a computer usable medium having computer readable program code means embodied therein for causing the identifying of address faults, said computer readable program code means in said article of manufacture comprising:

computer readable program code means for selecting a group of data bits to comprise a data word, the selecting being according to a H-matrix, and further selecting at least one unused data bit according to the H-matrix;

computer readable program code means for generating at least one extra storage parity bit corresponding to an address to which said data word is intended to be transmitted to;

computer readable program code means for generating a plurality of check bits by substituting said at least one extra storage parity bit in place of said at least one unused data bit;

computer readable program code means for writing said data word and said check bits to memory;

computer readable program code means for detecting an uncorrectable error during transmission of the data word; and computer readable program code means for determining whether said uncorrectable error is an address fault using said check bits.

29. The article of manufacture of claim 28, wherein said uncorrectable error is detected according to an error correction code.

30. The article of manufacture of claim 29, further comprising computer readable program code means for generating said error correction code according to a H-matrix comprising a plurality of subsets arranged in a plurality of rows and columns, wherein each of at least one row of said plurality of rows comprises, in part, multiple iterations of one subset of said plurality of subsets, and a remainder of said plurality of rows comprises, in part, a cyclic permutation of all remaining subsets of said plurality of subsets.

31. The article of manufacture of claim 28, further comprising computer readable program code means for isolating said address fault to a subgroup of address bits of a group of address bits corresponding to an address to which said data word was intended to be transmitted, wherein said subgroup of address bits contains at least one faulty bit.

32. The article of manufacture of claim 28, wherein said uncorrectable error comprises address faults as well as other uncorrectable errors.

33. The article of manufacture of claim 28, wherein said uncorrectable error comprises address faults and memory data failures, and wherein said computer readable program code means for determining further comprises computer readable program code means for distinguishing said address faults from said memory data failures.

34. The article of manufacture of claim 28, further comprising:

computer readable program code means for generating at least one extra retrieval parity bit corresponding to an address from which said data word is intended to be transmitted from; and computer readable program code means for identifying said address fault by utilizing said extra storage and extra retrieval parity bits.

35. The article of manufacture of claim 34, wherein said address to which said data word is intended to be transmitted to corresponds to a plurality of subgroups of address bits, with each subgroup of address bits corresponding to a parity bit of a group of parity bits, and wherein each extra storage parity bit has associated therewith a subgroup of parity bits of said group of parity bits, said computer readable program code means for generating at least one extra storage parity bit comprising:

computer readable program code means for setting each of said parity bits to 1 or 0 so that a set comprising said parity bit and said subgroup of address bits corresponding to said parity bit has an odd number of 1's for an odd parity computer system and an even number of 1's for an even parity computer system; and computer readable program code means for performing an exclusive OR function on said subgroup of parity bits associated with said extra storage parity bit thereby resulting in said at least one extra storage parity bit.

36. The article of manufacture of claim 34, wherein said address from which said data word is intended to be transmitted from corresponds to a plurality of subgroups of address bits, with each subgroup of address bits corresponding to a parity bit of a group of parity bits, and wherein each extra retrieval parity bit has associated therewith a subgroup of parity bits of said group of parity bits, said computer readable program code means for generating at least one extra retrieval parity bit comprising:

computer readable program code means for setting each of said parity bits to 1 or 0 so that a set comprising said parity bit and said subgroup of address bits corresponding to said parity bit has an odd number of 1's for an odd parity computer system and an even number of 1's for an even parity computer system; and computer readable program code means for performing an exclusive OR function on said subgroup of parity bits associated with said extra retrieval parity bit thereby resulting in said at least one extra retrieval parity bit.

37. The article of manufacture of claim 34, further comprising:

computer readable program code means for retrieving said data word and said plurality of check bits from memory;

computer readable program code means for generating a syndrome by substituting said at least one extra retrieval parity bit in place of said at least one unused data bit and for performing an exclusive OR function on said remainder of said data bits of said group of data bits, said at least one extra storage parity bit, and a check bit of said plurality of check bits corresponding to said group of data bits; and computer readable program code means for decoding said syndrome to determine said address fault.

38. The article of manufacture of claim 37, wherein said computer readable program code means for decoding comprises computer readable program code means for indicating an address fault condition identifying a subgroup of address bits of a group of address bits corresponding to an address to which said data word was intended to be transmitted, wherein said subgroup of address bits contains at least one faulty bit.

39. The article of manufacture of claim 34, further comprising:

computer readable program code means for forcing said at least one extra storage parity bit and said at least one extra retrieval storage parity bit to a constant to disable address fault detection.

40. The article of manufacture of claim 39, wherein said computer readable program code means for forcing comprises computer readable program code means for programmable forcing.

* * * * *